United States Patent
Yi et al.

(10) Patent No.: US 7,220,036 B2
(45) Date of Patent: May 22, 2007

(54) THIN DIRECT-LIT BACKLIGHT FOR LCD DISPLAY

(75) Inventors: Jennifer R. Yi, Roseville, MN (US); Robert M. Emmons, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 120 days.

(21) Appl. No.: 11/133,504

(22) Filed: May 20, 2005

(65) Prior Publication Data

US 2006/0262555 A1    Nov. 23, 2006

(51) Int. Cl.
   *F21V 7/04*    (2006.01)
(52) U.S. Cl. ........................ 362/561; 362/614
(58) Field of Classification Search ........... 362/614, 362/561
   See application file for complete search history.

(56) References Cited

U.S. PATENT DOCUMENTS

| | | | |
|---|---|---|---|
| 4,310,584 A | 1/1982 | Cooper et al. | |
| 4,791,540 A | 12/1988 | Dreyer et al. | |
| 5,161,041 A | 11/1992 | Abileah et al. | |
| 5,186,530 A | 2/1993 | Whitehead | |
| 5,479,328 A | 12/1995 | Lee et al. | |
| 5,720,545 A * | 2/1998 | Shaw | 362/245 |
| 5,882,774 A | 3/1999 | Jonza et al. | |
| 6,080,467 A | 6/2000 | Weber et al. | |
| 6,341,879 B1 | 1/2002 | Skinner et al. | |
| 6,416,201 B1 | 7/2002 | Strand et al. | |
| 6,692,137 B2 | 2/2004 | Blanchard | |
| 6,724,446 B2 | 4/2004 | Motomura et al. | |
| 6,846,089 B2 | 1/2005 | Stevenson et al. | |
| 6,905,220 B2 | 6/2005 | Wortman et al. | |
| 6,971,780 B2 | 12/2005 | Lee et al. | |
| 2003/0184993 A1 * | 10/2003 | Yamada | 362/31 |
| 2005/0001537 A1 | 1/2005 | West et al. | |

FOREIGN PATENT DOCUMENTS

| | | |
|---|---|---|
| JP | 08-136923 | 5/1996 |
| JP | 08-146415 | 6/1996 |
| JP | 2003-222864 | 8/2003 |
| KR | 10-2002-0067232 | 8/2002 |
| KR | 10-2002-0085836 | 11/2002 |
| KR | 10-2004-0019752 | 3/2004 |
| WO | WO 2005/078487 | 8/2005 |

OTHER PUBLICATIONS

3M Specified Construction Products Department Technical Bulletin, "Optical Lighting Film Application Bulletin Thin Sign Box Sheets", Effective Date: Feb. 1, 2001.
U.S. Application entitled "Direct-lit Liquid Crystal Displays with Laminated Diffuser Plates", filed on Oct. 15, 2004, having U.S. Appl. No. 10/966,610.
U.S. Application entitled "Composite Diffuser Plates and Direct-lit Liquid Crystal Displays Using Same", filed on Oct. 15, 2004, having U.S. Appl. No. 10/965,937.

* cited by examiner

*Primary Examiner*—Ali Alavi
*Assistant Examiner*—Hargobind S. Sawhney
(74) *Attorney, Agent, or Firm*—Stephen C. Jensen

(57) ABSTRACT

Direct-lit backlights and associated methods are disclosed in which an array of elongated light sources is placed in a cavity between a diffuser plate and a back reflector. The back reflector is a specular reflector that can have a divergence half-angle of about 10 degrees or less. The diffuser plate can be of the type that has uniform diffusing properties over its useful area. Appropriate placement of the diffuser plate, light sources, and back reflector can yield a backlight having exceptional thinness, brightness uniformity, and average brightness.

13 Claims, 15 Drawing Sheets

THIN DIRECT-LIT BACKLIGHT FOR LCD DISPLAY

FIELD OF THE INVENTION

The present invention relates to backlights, such as those used in liquid crystal display (LCD) devices and similar displays, as well as to methods of making backlights.

BACKGROUND

Recent years have seen tremendous growth in the number and variety of display devices available to the public. Computers (whether desktop, laptop, or notebook), personal digital assistants (PDAs), mobile phones, and thin LCD TVs are but a few examples. Although some of these devices can use ordinary ambient light to view the display, most include a backlight to make the display visible.

Many such backlights fall into the categories of "edge-lit" or "direct-lit". These categories differ in the placement of the light sources relative to the output face of the backlight, where the output face defines the viewable area of the display device. In edge-lit backlights, a light source is disposed along an outer border of the backlight construction, outside the area or zone corresponding to the output face. The light source typically emits light into a light guide, which has length and width dimensions on the order of the output face and from which light is extracted to illuminate the output face. In direct-lit backlights, an array of light sources is disposed directly behind the output face, and a diffuser is placed in front of the light sources to provide a more uniform light output. Some direct-lit backlights also incorporate an edge-mounted light, and are thus capable of both direct-lit and edge-lit operation.

It is known for direct-lit backlights to use an array of cold cathode fluorescent lamps (CCFLs) as the light sources. It is also known to place a diffuse white reflector as a back reflector behind the CCFL array, to increase brightness and presumably also to enhance uniformity across the output face.

An example of this is shown in FIG. 1, which illustrates in a schematic sectional exploded view selected optical components of a liquid crystal display television (LCD TV) 10, commercially available from Samsung Corp. as model LTN226W. This figure is not to scale, and some of the features are exaggerated for ease of illustration. The LCD TV 10 has a 22-inch screen size and a 16:9 aspect ratio, meaning the screen is about 10.8 inches (275 mm) in height and 19.2 inches (485 mm) in width. In this regard, height, width, and depth correspond to the Cartesian x-, y-, and z-axes respectively shown in the figure. The LCD TV 10 has an LCD panel 12 viewable by the observer 13, and a collection of components forming a backlight 14 behind the LCD panel 12.

In the backlight 14, light is generated by an array of eight CCFL sources 16, each of which spans the width of the TV screen and which have a uniform center-to-center spacing S of about 33.8 mm. The sources have a circular cross-sectional shape about 3 mm in diameter (diameter=2R). They are disposed between a patterned diffuser plate 18 and a back reflector 20. The diffuser plate 18 transmits light but with a substantial amount of scattering to provide light diffusing characteristics. The diffuser plate also has on its back surface a printed dot pattern, which pattern is in registration with the light sources 16. That is, the printed dot pattern is more dense at locations directly above the light sources 16 and less dense at locations between neighboring light sources. Thus, the diffuser plate 18 is highly non-uniform over its useful area. The back reflector 20 is an opaque white film or paint coated onto a stiff metal substrate. The setback distance D from the diffuser plate 18 to the sources 16, measured from the back surface of the diffuser plate to the center of the sources, is about 11.1 mm, and the distance T from the sources 16 to the back reflector 20 (measured from the center of the sources to the front surface of the back reflector) is about 5.6 mm. The overall gap dimension G from the diffuser plate 18 to the back reflector, which is measured from the back surface of the diffuser plate to the front surface of the back reflector, and which satisfies G =D+T, is about 16.7 mm. Atop the diffuser plate 18 is a film stack consisting of: a beaded diffuser film 22 with an outer beaded layer facing the front of the backlight/display as shown; a prismatic brightness enhancement film 24 (Vikuiti™ Brightness Enhancement Film-III-Transparent (BEFIII-T), available from 3M Company) oriented as shown, with prisms facing the front of the backlight/display; and a reflective polarizer 26 (Vikuiti™ Dual Brightness Enhancement Film-Diffuse 440 (DBEF-D440), available from 3M Company). The reflective polarizer 26 can be considered to form the outermost film or layer of the backlight 14.

The backlight 14 illuminates LCD panel 12, which comprises an electronically addressable liquid crystal array sandwiched between glass plates. The panel 12 also includes a front and back absorbing polarizer, and a color filter matrix.

BRIEF SUMMARY

The present application discloses, inter alia, direct-lit backlights and associated methods in which an array of light sources is disposed between a back reflector and a front diffuser. We have found that by using a specularly reflective film for the back reflector, the backlight can be made thinner and brighter with little or no detrimental effect on brightness uniformity. The sources are preferably positioned at or near the back reflector, such that $R \leq T \leq 1.5R$, or even $R \leq T \leq 1.1R$, where T is measured from the center of the light sources to the front surface of the back reflector and R is half the diameter of the light sources. We have also identified an advantageous relationship between the source-to-source spacing S and the setback distance D that can be used to construct thin direct-lit backlights with good uniformity across the output surface of the backlight. In particular, we have found that the ratio S/D is preferably about 2 or greater, or in a range from about 2 to 3, for example from about 1.5 to 3.5 or 2 to 3.5.

Significantly, the front diffuser can have a substantially uniform, non-patterned design. That is, the front diffuser can diffuse light to the same degree regardless of where on its surface the light impinges. This can simplify manufacture and avoid having to register the front diffuser with the light sources.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF THE ILLUSTRATIVE EMBODIMENTS

Figure 2:
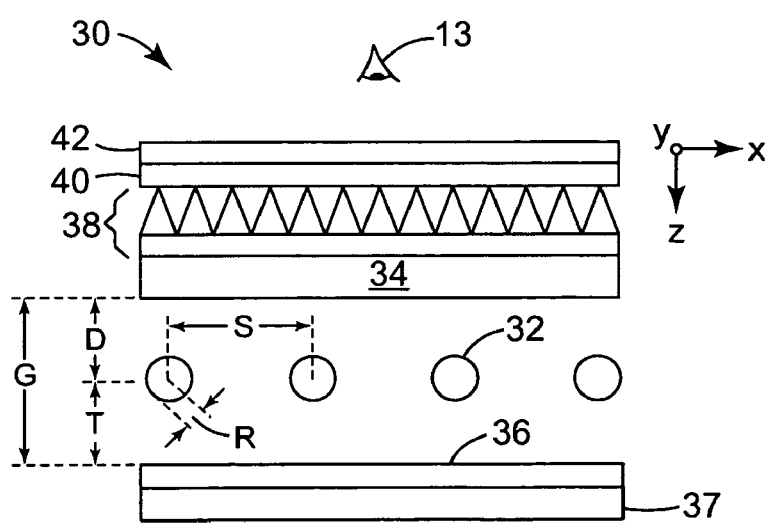
FIG. 2 is a schematic sectional view of a direct-lit backlight having a generalized back reflector.

In FIG. 2, we see a schematic sectional view of another direct-lit backlight 30. Light is generated in the backlight 30 by an array of sources 32, each of which spans the width of the backlight output surface and which have a uniform center-to-center spacing S. The sources can be right circular cylindrical CCFL sources or any other conventional extended light sources, characterized by a diameter (i.e., a maximum lateral dimension when viewed in cross section) of 2R. The sources can also be separate portions of a single serpentine fluorescent bulb. The sources 32 can have cross-sectional shapes other than circular, e.g., elliptical, square, triangular, or any other desired shape or combination of shapes. In non-circular embodiments, the diameter of the sources can be taken to be a maximum lateral dimension when viewed in cross section, i.e. in the x-z plane where the sources extend along the y-axis. Alternatively, the diameter can be the lateral dimension of the sources along an axis perpendicular to their length but parallel to the back reflector 36, i.e., along the x-axis. The sources are disposed between a diffuser plate 34 and a back reflector 36.

Preferably, the diffuser plate, sources, and back reflector are arranged with substantially no additional optical films included between the diffuser plate and the back reflector, even where other optical films are present in a film stack atop the diffuser plate as described below. In some cases however it may be desirable to include one or more optical films between the diffuser plate and the sources, or between the diffuser plate and the back reflector.

The diffuser plate 34 transmits light but with a substantial amount of forward scattering to provide light diffusing characteristics. The diffuser plate 34 is shown as a single member, but it may also be or comprise two or more members such as two or more different types of diffusing films placed one atop another. In exemplary embodiments the diffuser plate 34 is substantially uniform over its useful area, so that it lacks any discernable pattern, and registration with the light sources is not an issue. In some cases however the backlight designer may wish to provide the diffuser plate with a patterned or printed non-uniform diffusing agent in a small or moderate amount. Exemplary diffuser plates 34 have a transmission in the range of about 40 to 70 percent, nearly 100% haze, a diffusion half angle of about 50 degrees or more, and an absorption of less than 5%, preferably less than 1%. In this regard, transmission refers to a photopically weighted average transmission for all transmitted light including forward-scattered light within a hemispheric solid angle; diffusion half-angle refers to the angle between the direction of maximum intensity $I_0$ and the direction at which the intensity drops to half ($I_0/2$) for light transmitted or reflected by an optical body; and haze refers to haze as measured on a BYK Gardner Haze-Guard Plus.

The back reflector 36 preferably reflects light substantially specularly rather than substantially diffusely. In that regard, the back reflector preferably reflects an incident collimated beam of light into a low divergence reflected beam, i.e., a reflected beam whose diffusion half angle is 10 degrees or less. An exemplary back reflector 36 comprises a sheet of Vikuiti™ Enhanced Specular Reflector (ESR), available from 3M Company, which can be laminated to an optional substrate 37 for mechanical stability. The ESR film is a high reflectivity, all-polymeric multilayer film made by coextrusion of a multitude of alternating polymer layers and biaxially stretching the cast film. This film can achieve a 98% or better reflectivity across the visible spectrum. See, for example, U.S. Pat. No. 5,882,774 (Jonza et al.). Back reflector 36 can alternatively include other types of reflective interference films, including polymeric and/or inorganic multilayer films in which all the layers of the interference stack have isotropic refractive indices. The back reflector preferably has a high average visible reflectivity for optimum performance and efficiency, e.g., at least 90%, at least 95%, or at least 98%. Another suitable specular back reflector 36 includes simple or enhanced metallic reflectors, such as Alanod™ brand anodized aluminum sheeting and the like. The substrate 37 can be or comprise a thin but rigid flat plate or sheet, composed of materials such as plastic, metal, or other suitable materials.

To produce a specularly reflected beam whose divergence is no more than about 10 degrees, a variety of back reflector configurations can be used. For minimum divergence, a very low scattering film such as ESR can be held very flat over its useable area such as by lamination to a solid flat substrate. In other cases, a small slope variation such as an "orange peel" texture or low profile corrugation can be imparted to the ESR film or the like to enhance the mechanical stability of the backlight construction. Such slope variations can add mechanical stiffness, and can reduce the sensitivity of the back reflector performance to angular misalignments between the back reflector 36 and the sources 32 and/or diffuser plate 34. The slope variations can be in the form of features whose local surfaces deviate from a flat design by, for example, about 10 degrees or less. Other configurations that can slightly broaden the specular reflection peak to a divergence no more than about 10 degrees include embossing microreplicated features in an ESR film or the like, or in a clear material coated onto or overlaying the ESR film.

The setback distance D from the diffuser plate 34 to the sources 32 (measured from the back surface of the diffuser plate to the center of the sources) is selectable based on various design criteria, as is the distance T from the sources 32 to the back reflector 36 (measured from the center of the sources to the front surface of the back reflector). The overall gap dimension G from the diffuser plate 34 to the back reflector, which is measured from the back surface of the diffuser plate to the front surface of the back reflector, satisfies G=D+T. Atop the diffuser plate 34 is an optional film stack that can consist of or comprise: a prismatic brightness enhancement film 38 (such as Vikuiti™ Brightness Enhancement Film-III-Transparent (BEFIII-T), available from 3M Company, or like films) that can be oriented as shown, with prisms facing the front of the backlight/display; a reflective polarizer 40 (such as Vikuiti™ Dual Brightness Enhancement Film-Diffuse 40 (DBEF-D440), available from 3M Company, or like films); and a conventional absorbing polarizer 42, sometimes referred to as a dichroic polarizer. The absorbing polarizer 42 has a transmission axis, disposed in the x-y plane, that is aligned with the transmission axis of reflective polarizer 40 for optimum throughput and brightness. In the embodiment of FIG. 2, the absorbing polarizer 42 can be considered to form the outermost film or layer of the backlight 30. In other embodiments the absorbing polarizer 42 may be considered as part of the accompanying LCD display, in which case the reflective polarizer 40 would be the outermost film or layer forming the output surface of the backlight 30.

The film stack can optionally include a variety of other components in addition to those described above. Components of the film stack can be removed, substituted, and rearranged in a variety of ways. For example, the film stack can contain surface diffusers and EMI shielding films. The film stack can also contain a second sheet of prismatic brightness enhancement film whose orientation is rotated relative to the first prismatic film such that the prisms of the second sheet are disposed at an angle approximately 90 degrees from the prisms of the first sheet. In addition, films such as DBEF-D TV, available from 3M Company, can combine the functions of multiple optical films into a single product.

Figure 1:
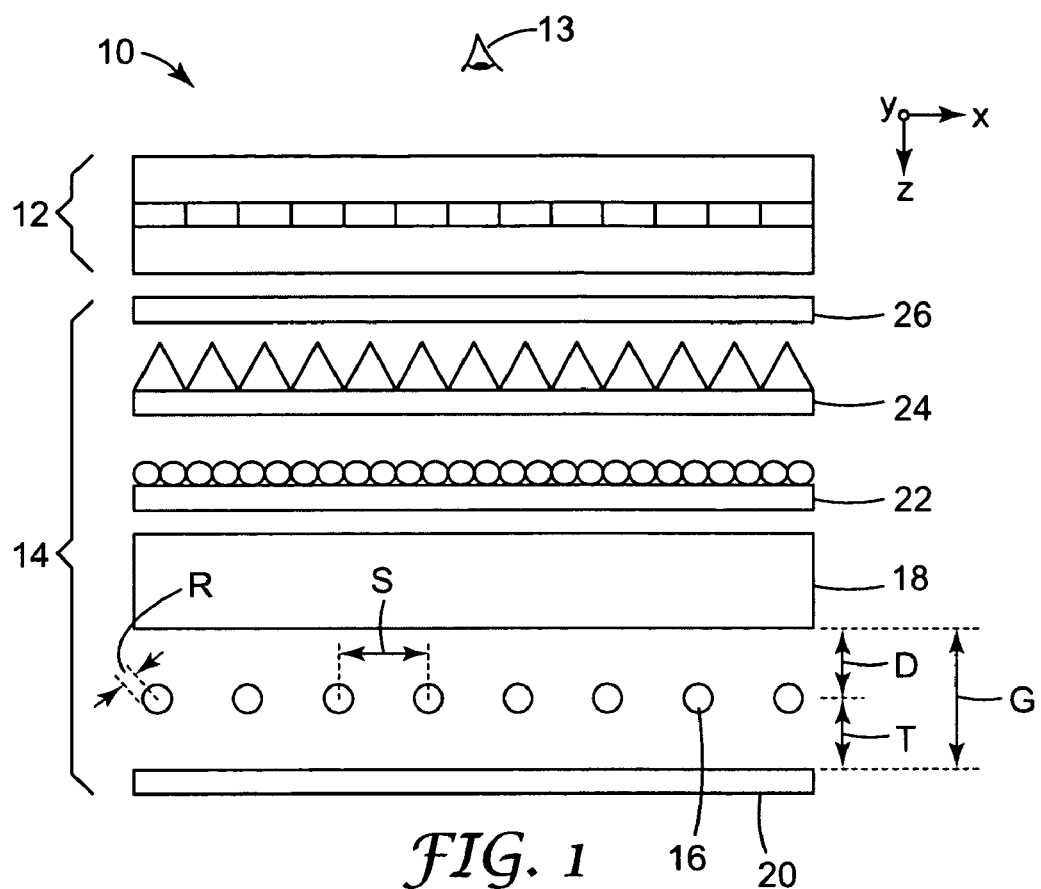
FIG. 1 is a schematic sectional exploded view of the optical components of a commercially available LCD-TV, which includes a direct-lit backlight having a diffusely reflective back reflector.

We have modeled the performance of direct-lit backlights similar to those of FIGS. 1 and 2. The model utilizes the ASAP optical modeling program available from Breault Research Organization, Tucson, Ariz. to simulate a simple backlight. The model includes a rectangular cavity in which three right circular cylindrical bulbs or light sources are disposed. The sources are parallel to each other, with each extending along one direction of the cavity, such as the y-axis in FIGS. 1 and 2. In an orthogonal direction, for example, along the x-axis of FIGS. 1 and 2, the sources have a center-to-center spacing S of 30 mm. The model assumes the sources are infinitely long in the y-direction (by using sources of arbitrary length combined with ideal mirror planes), and that they are bounded along the x-direction by two perfectly reflecting flat side walls—each parallel to the y-z plane and located a distance S/2 (15 mm) from the center of the respective outermost bulb. These side walls effectively simulate an infinite cavity model, whose results will be the same for an arbitrary number of sources, including for example 2, 5, 10, or 100 or more. The depth G of the backlight cavity, and the position of the light sources in the cavity is variable. In particular, the distance T from the centers of the light sources to the near surface of the back reflector, and the distance D from the centers of the sources to the near surface of the front diffuser plate, can be selected as desired. The various distances can be expressed in convenient units, or as ratios. For example, the setback distance D can be related to the source-to-source spacing S by use of a ratio S/D, and the distance T can be expressed in units of source radii R. In many respects these ratios are more significant than the individual values of S, D, T, and R. The sources themselves are modeled as perfect diffuse (i.e., Lambertian) scattering surfaces with a given amount of transmission and reflection. Transmission values for the sources were modeled at 50% and 100%, where 50%–80% is believed to be representative of fluorescent bulbs used in most commercial systems. Absorption is modeled as zero, so that reflection plus transmission for the sources equals 100%.

The appearance, including the brightness, uniformity, and color, of a backlight also depends on characteristics of the diffuser plate and film stack used in the backlight. The model investigated three main configurations. In a first configuration, the model assumed an ideal Lambertian diffuser plate of 100% transmission, but with no film stack. In a second configuration, an ideal Lambertian diffuser plate of 60% transmission, also with no accompanying film stack, was assumed. In a third configuration, the 60% transmissive Lambertian diffuser plate was combined with a film stack consisting of a single sheet of prismatic brightness enhancement film (BEF) and a reflective polarizer.

The ideal Lambertian diffuser plate was in each case modeled as uniform over its working area. This diffuser plate converts an incident light ray into a transmitted beam of Lambertian angular distribution. Where the diffuser plate has a transmission less than 100%, the magnitude of the transmitted beam is appropriately scaled to take into account the reduced transmittance, but a reflected beam of Lambertian angular distribution is also produced, having a magnitude of 100% minus the percent transmission (i.e., the diffuser plate is assumed to have no absorption). In the third configuration, the BEF utilized 90-degree prisms facing the front of the backlight and extending parallel to the sources, and having a refractive index of 1.565. The reflective polarizer was simply modeled as a 50% specular reflector, which also specularly transmitted 50% (no absorption). Except for this, the polarization feature of the ASAP modeling program was enabled, so that the polarization state of reflected and transmitted light was taken into account in the model.

The model calculates numerical values representative of brightness (in units proportional to candelas/(lux*$m^2$) of the modeled backlights as a function of position at the output of the backlight, i.e., for the first and second configurations, at the output of the respective diffuser plates, and for the third configuration, at the output of the film stack. Due to the symmetry of the model, i.e., because all optical components effectively extend indefinitely along the y-axis for all three configurations, the calculated brightness is a one-dimensional function that varies only as a function of position along the x-axis. One important characteristic of the calculated brightness distribution is the average brightness, since the ideal backlight has an average brightness that is as high as possible for maximum visibility and efficiency. Another important characteristic of the calculated brightness distribution is its variability, which provides a measure of how much the brightness changes across the face of the backlight due to the discrete light sources. In an ideal backlight, the variability is zero or at least relatively small, so that the backlight is uniformly bright across its output surface without significant bright spots or bands, or dark spots or bands. The more variable the brightness distribution, the more visible are the light sources or bulbs to the viewer of the display. A brightness variability factor was calculated for each illuminance distribution as follows:

$$\text{brightness variability}=((\max-\min)/(2*\text{avg})),$$

where max and min are the maximum and minimum brightness values respectively, and avg is the average value of the modeled brightness distribution.

The model was used to investigate the effect of replacing a diffuse back reflector (such as back reflector 20 in FIG. 1)

with a specular back reflector (such as back reflector 36 in FIG. 2), for a range of setback distances D. Of particular interest was how these design changes affected the variability of the brightness distribution. For this investigation, in addition to the characteristics of the model described above, the model assumed the following:

the sources have a circular cross-section of 3 mm diameter (R=1.5 mm);
the sources emit uniformly (in a Lambertian sense) over their outer surface;
the sources have a reflectivity of 50%;
the specular back reflector has a 98% reflectivity with 0% haze;
the diffuse back reflector has a 98% reflectivity with 96% haze, where haze is modeled as a purely Lambertian distribution and is believed to be reasonably representative of a wide-angle scattering medium, such as white paint;
the distance T from the centers of the lamps to the front of the back reflector is variable from 1.001 times the lamp radius, i.e., T=1.001R, to five times the lamp radius, i.e., T=5R; and
the setback distance D from the centers of the lamps to the back surface of the diffuser plate is variable from 30 mm to 3 mm, which corresponds to a range of 0.5 to 5 for the ratio S/D.

The model calculated the brightness distribution at the output of the backlight for these conditions, as described above. The brightness variability of the distributions was then calculated, and is plotted against the ratio S/D in FIGS. 3a–f. Note that as S/D increases, the backlight cavity is made thinner since S is fixed at 30 mm. In each of these figures, the solid line curve is for backlights having the specular back reflector, and the broken line curve is for backlights having the diffuse back reflector. The FIGS. 3a–f differ by the distance T from the centers of the lamps to the front of the back reflector, where T=1.001R for FIG. 3a, T=1.1R for FIG. 3b, T=1.5R for FIG. 3c, T=2R for FIG. 3d, T=3R for FIG. 3e, and T=5R for FIG. 3f. In other words, the sequence of FIGS. 3a–e shows the effect of increasing the separation between the sources and the back reflector, where in FIG. 3a the sources are close to and nearly in contact with back reflector, while in FIG. 3e the sources are relatively far from the back reflector.

Several conclusions can be drawn from the data. First, in all cases there is a general trend (with some exceptions, discussed below) of increased brightness variability and decreased backlight uniformity as the setback distance decreases, i.e., as S/D increases and the backlight cavity is made thinner. This is consistent with the expectation that the closer the light sources are to the diffuser plate, the more likely it is that they will be visible at the output of the backlight in the form of bright and/or dark bands. Second, and more surprisingly, a specular back reflector can provide the backlight with substantially better brightness uniformity (lower brightness variability) than can a diffuse back reflector, particularly for thinner cavities, for example, for values of S/D of about 2 and above, and for small values of T. Third, for a specified amount of brightness variation, such as 0.2 or 0.1, using a specular back reflector rather than a diffuse back reflector allows the cavity to have the thinnest profile, since S/D can be maximized and D can be minimized.

Figure 3A:
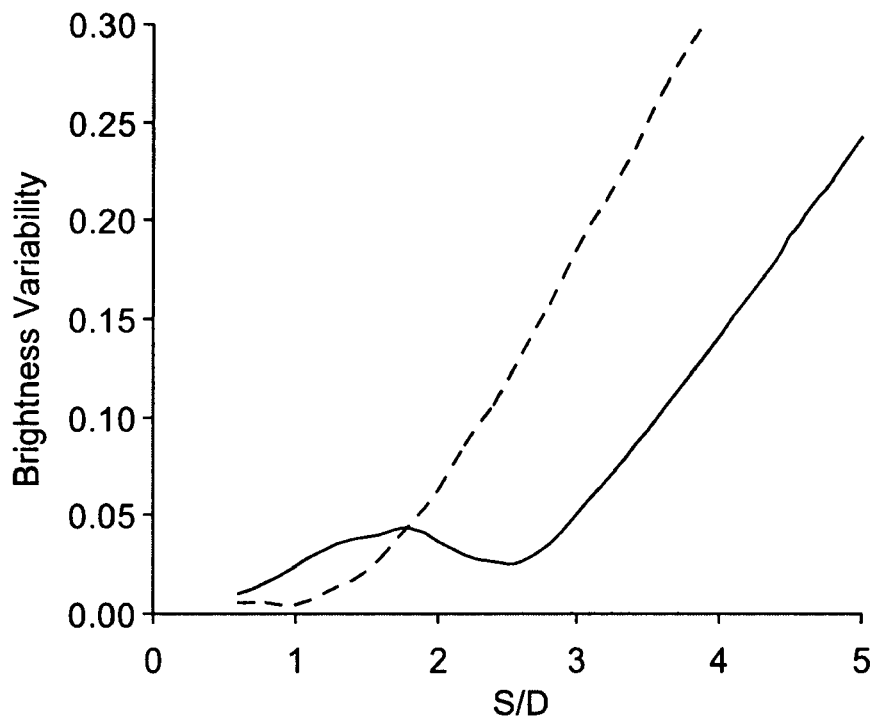
FIGS. 3a–f are graphs of modeled relative brightness variation across the backlight output surface versus the S/D ratio for a first modeled backlight configuration, for different distances from the sources to the back reflector, and where the reflectivity of the sources is 50%.
Figure 3B:
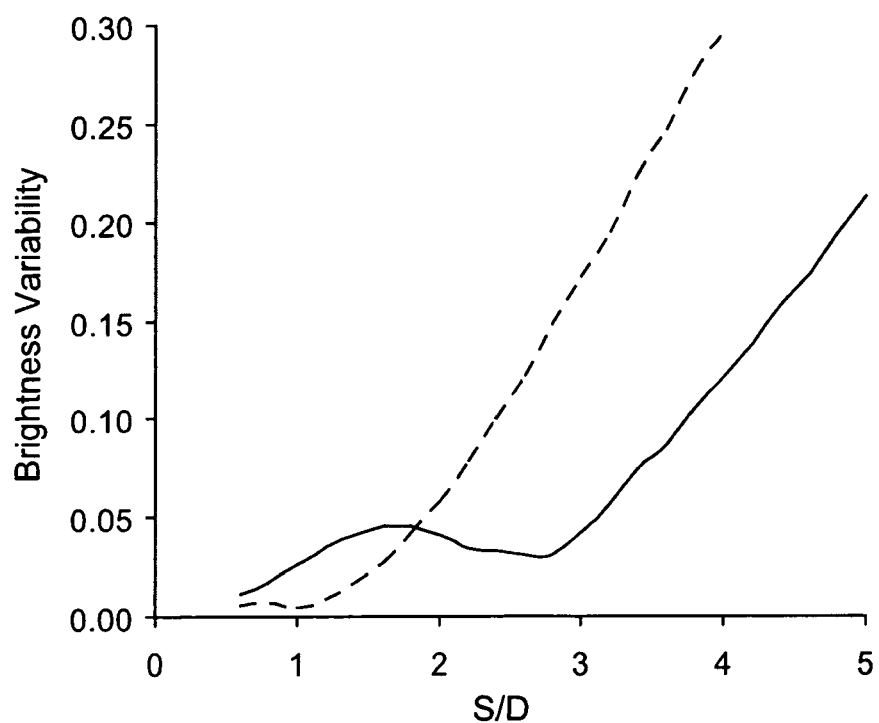
Figure 3C:
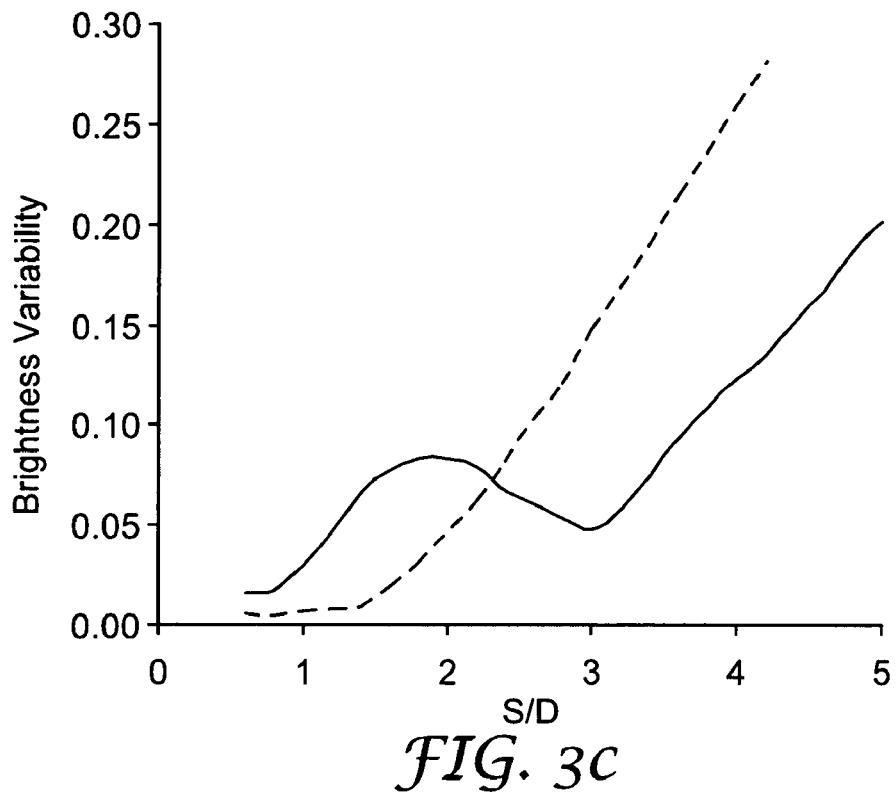
Figure 3D:
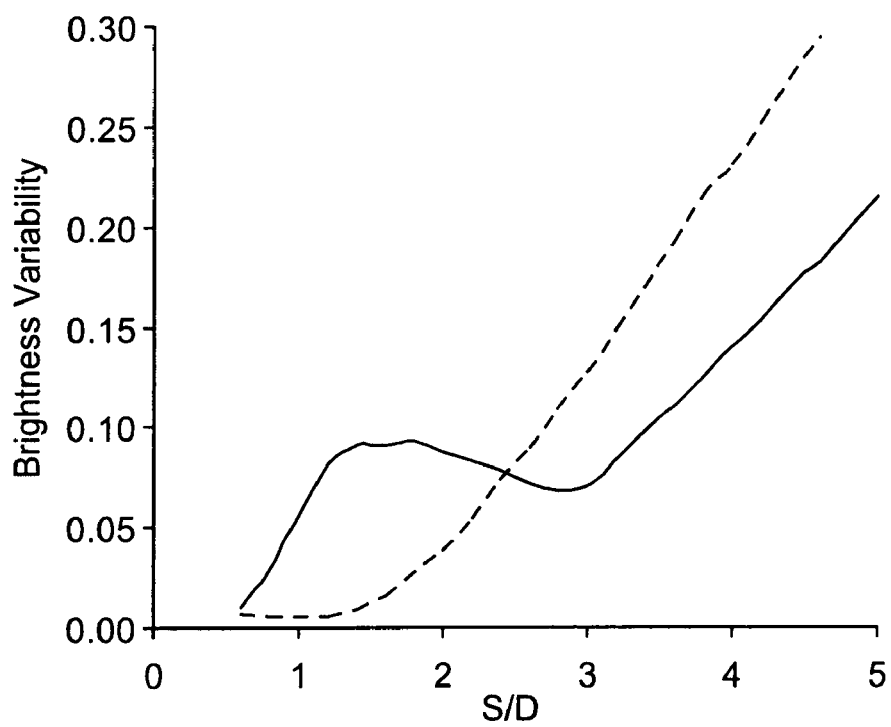
Figure 3E:
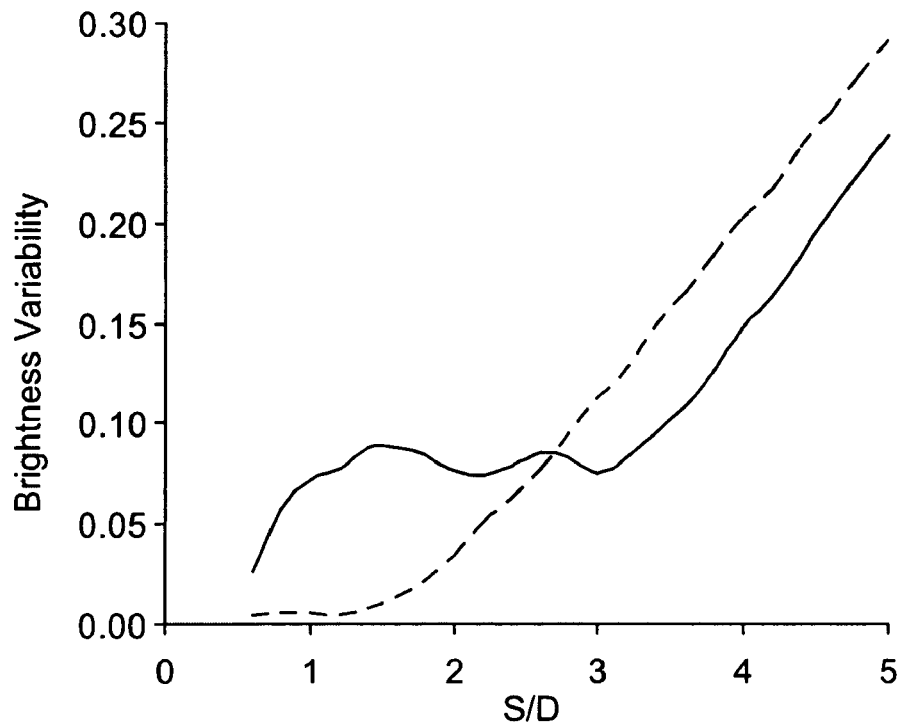
Figure 3F:
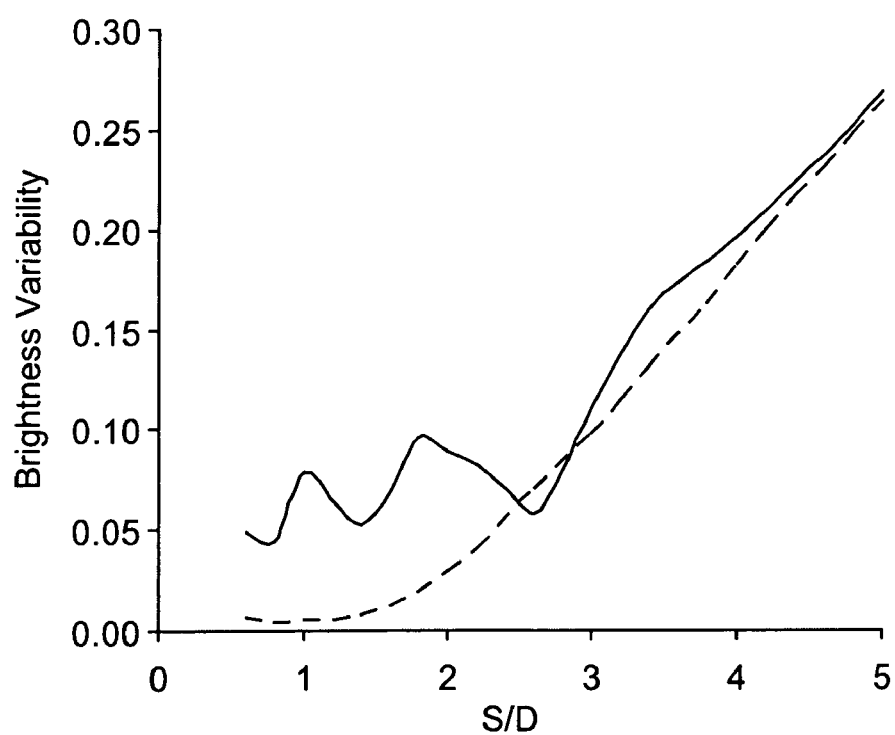
Figure 4A:
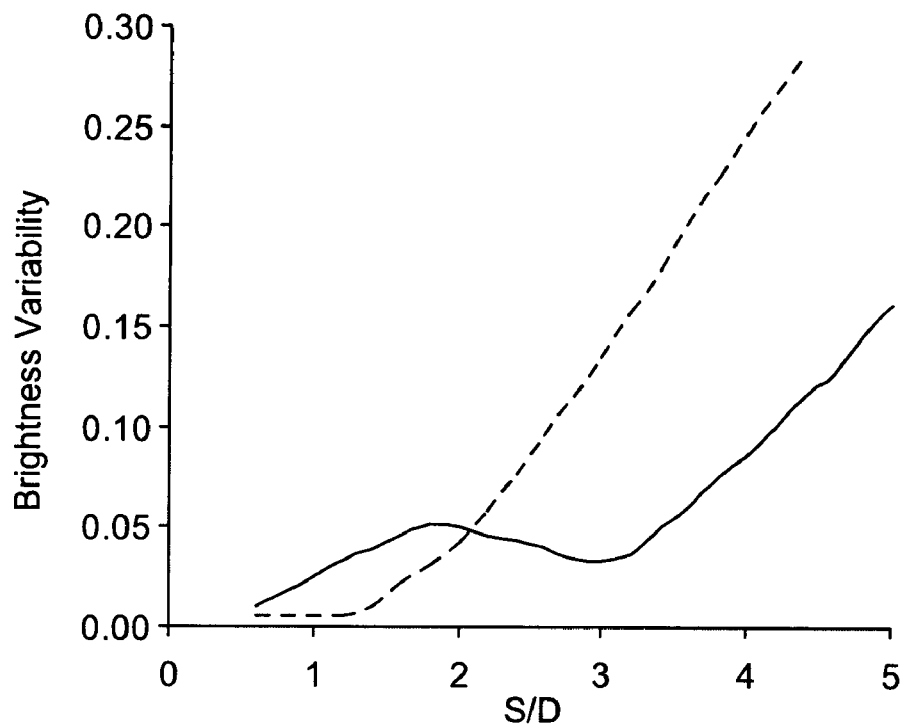
FIGS. 4a–f are graphs similar to FIGS. 3a–f, respectively, but where the reflectivity of the sources is 100%.
Figure 4B:
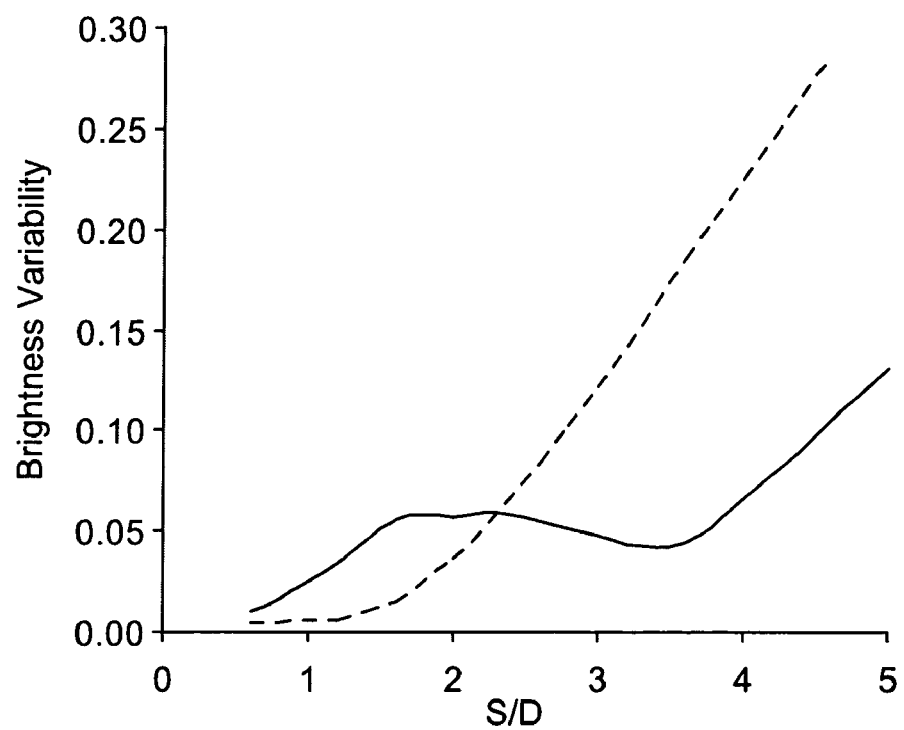
Figure 4C:
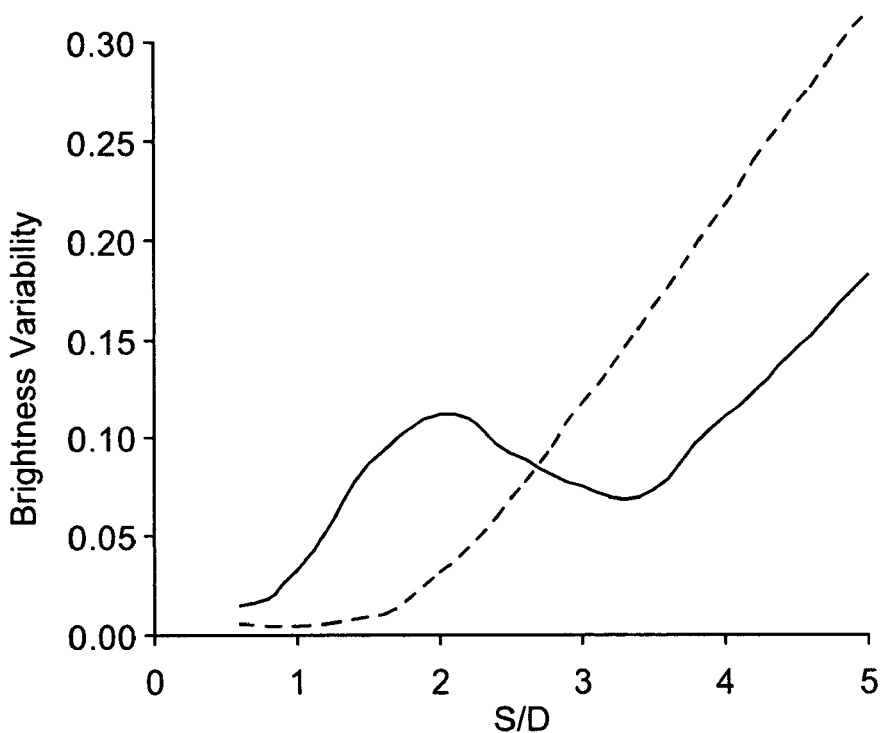
Figure 4D:
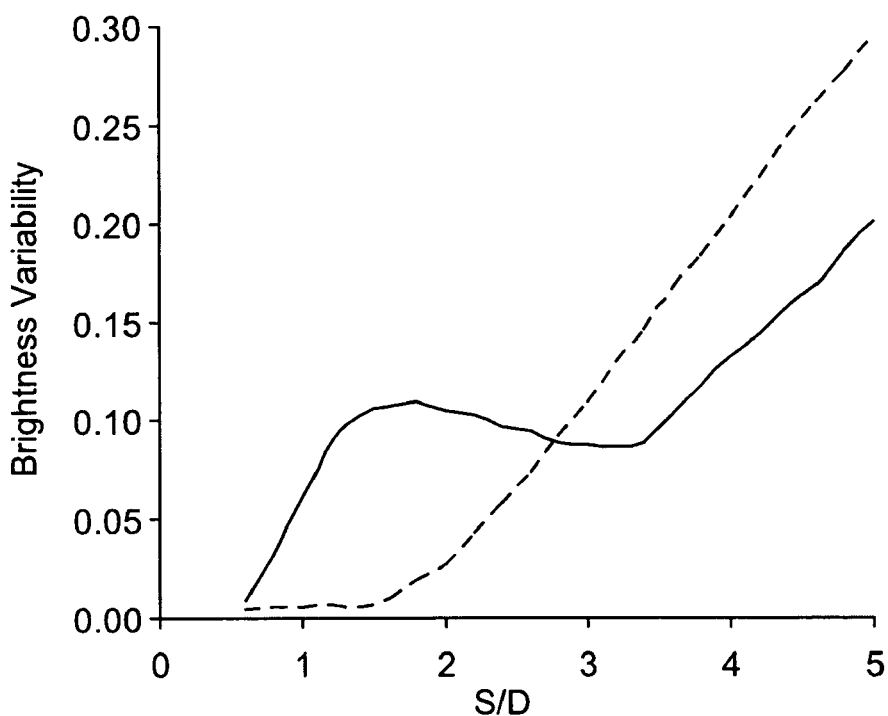
Figure 4E:
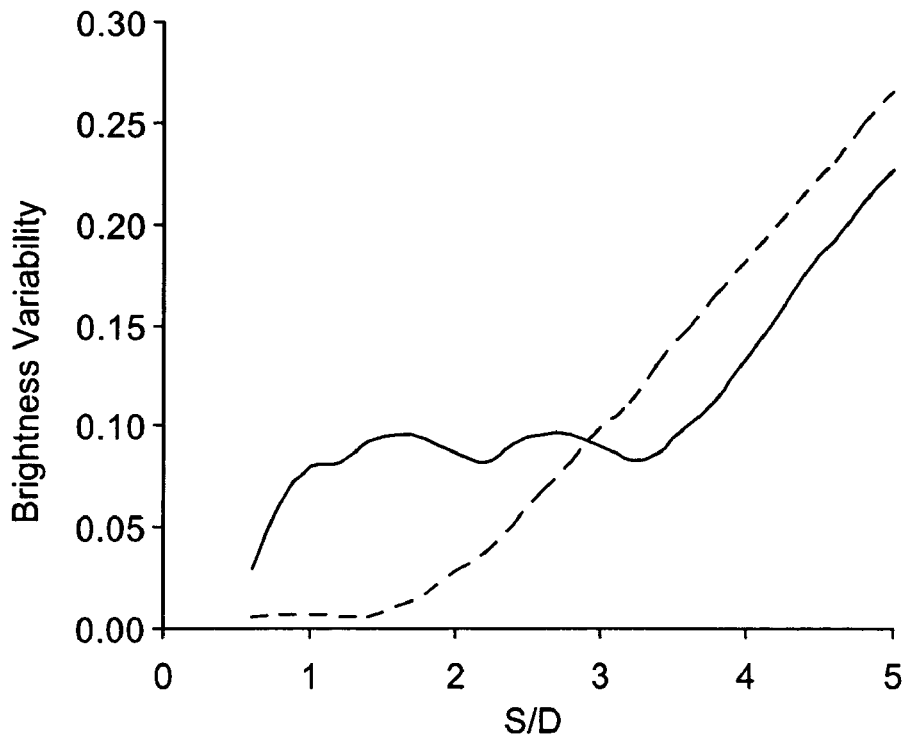
Figure 4F:
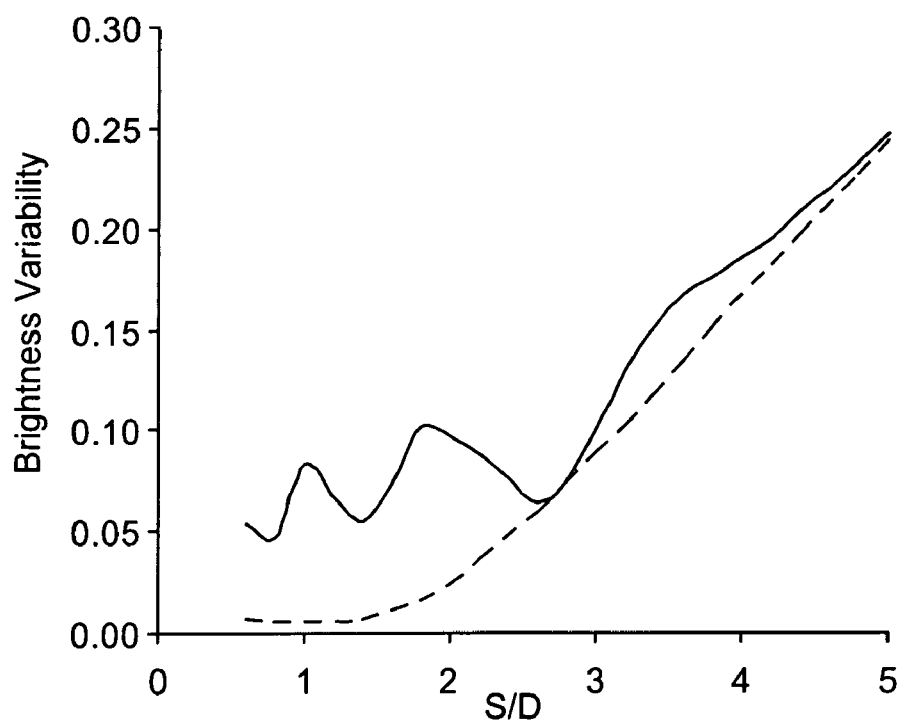
Figure 5A:
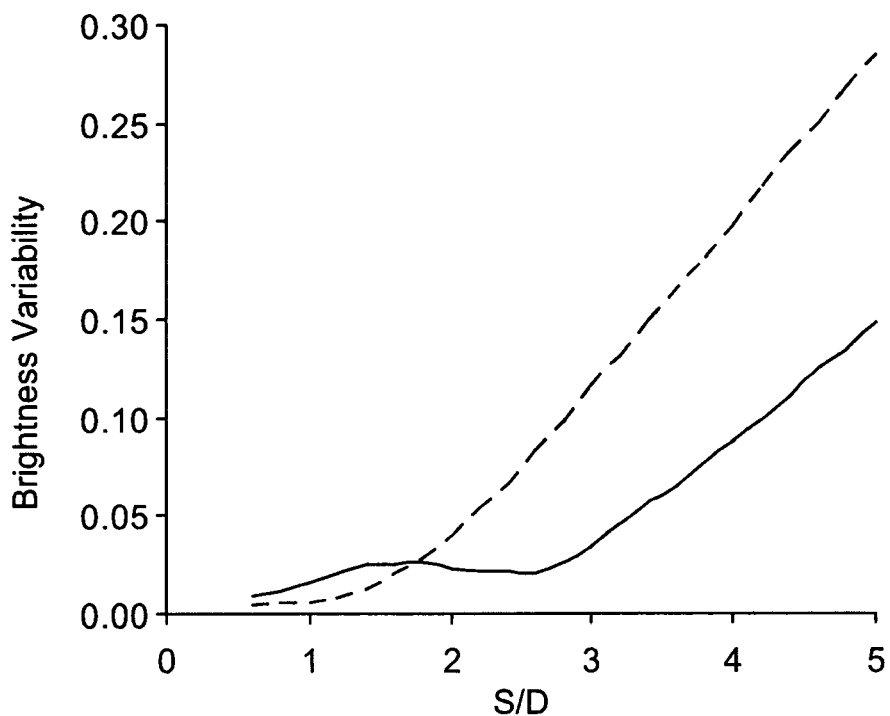
FIGS. 5a–f are graphs similar to FIGS. 3a–f, respectively, but for a second modeled backlight configuration.
Figure 5B:
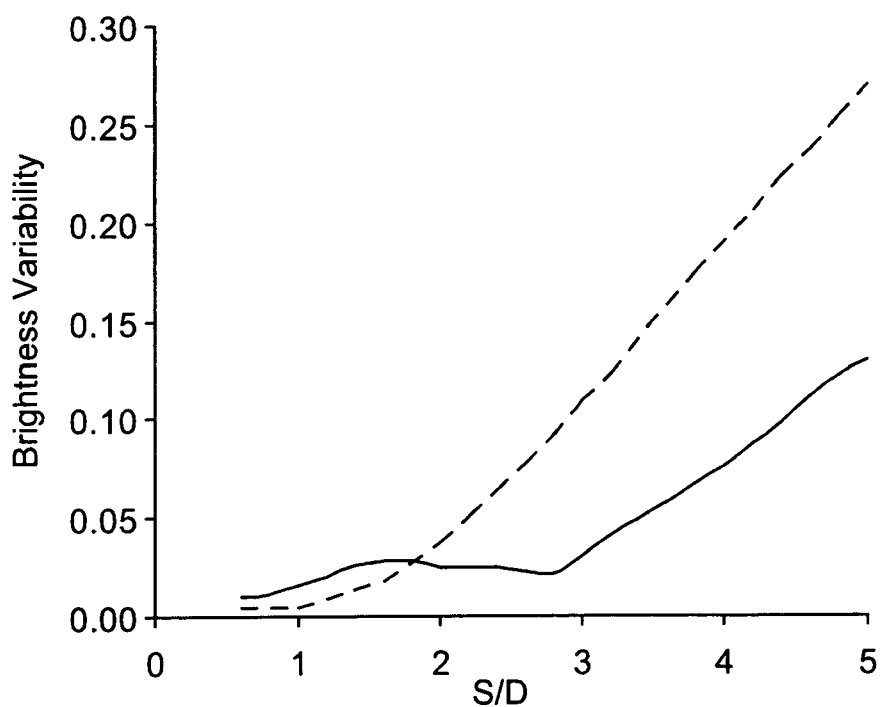
Figure 5C:
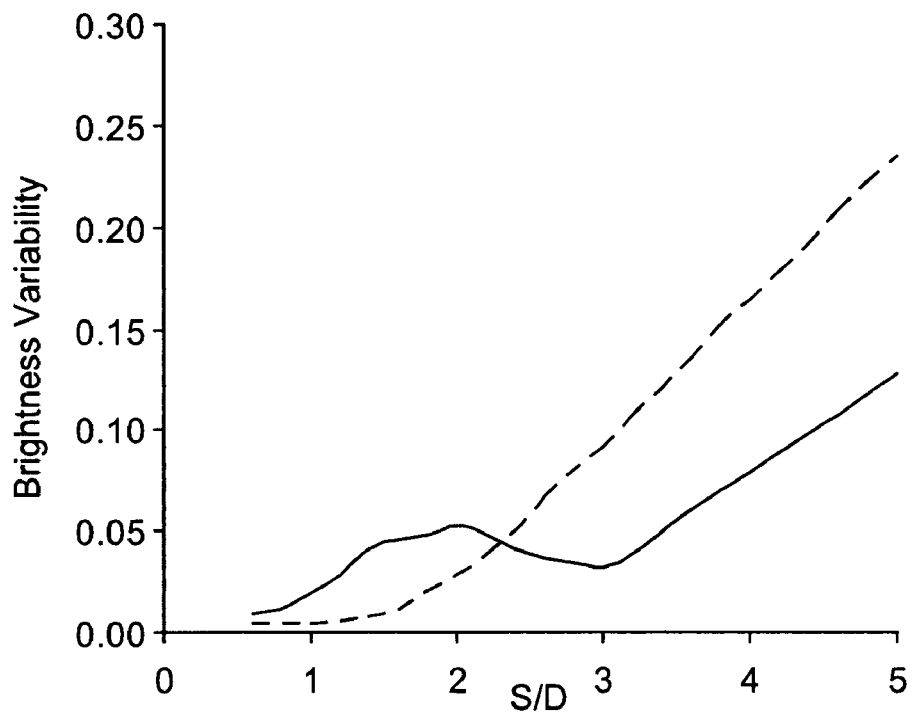
Figure 5D:
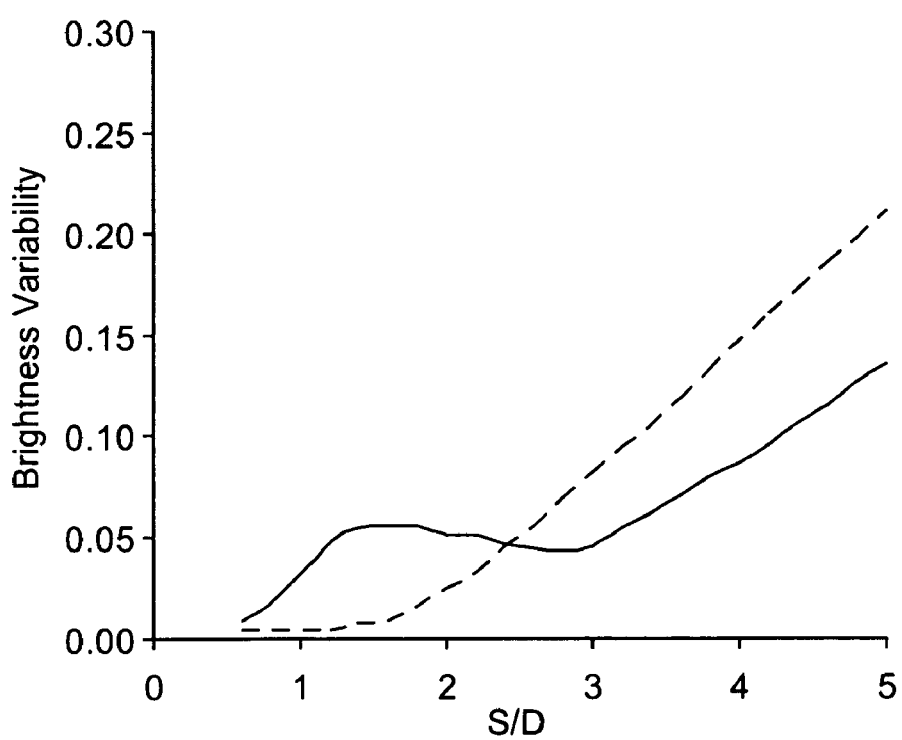
Figure 5E:
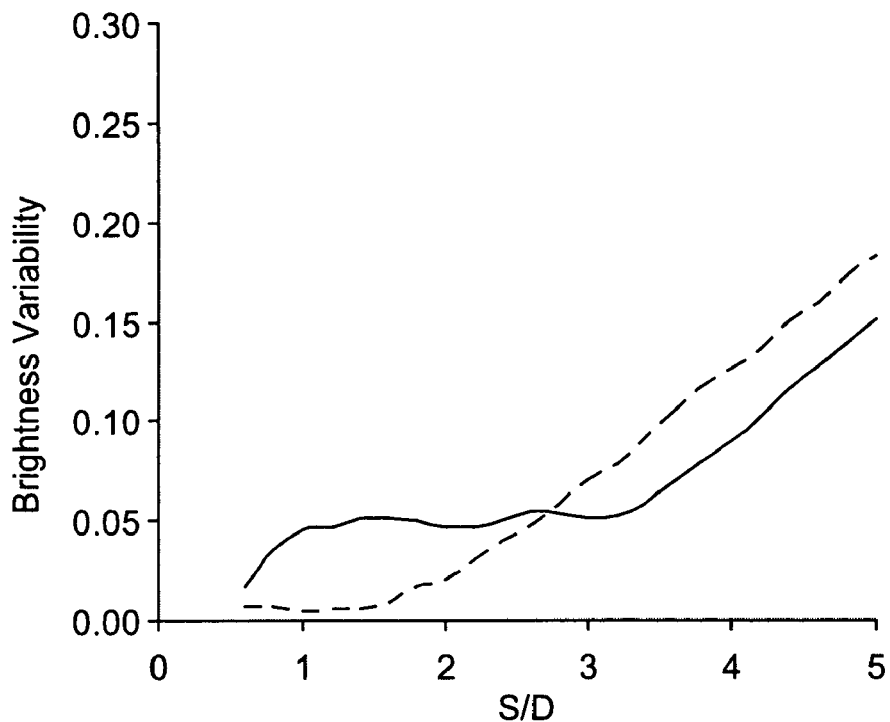
Figure 5F:
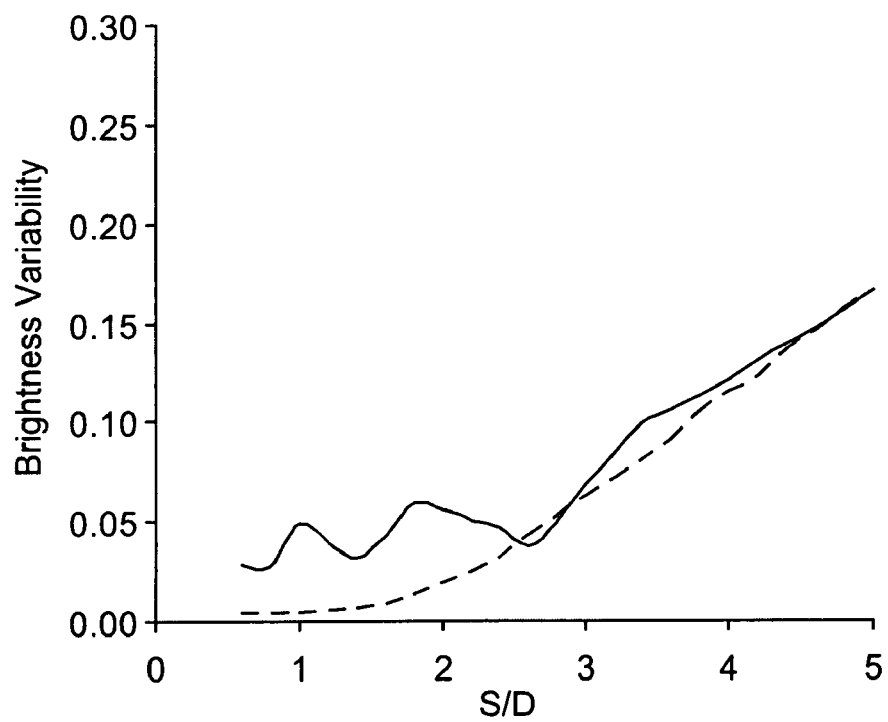
Figure 6A:
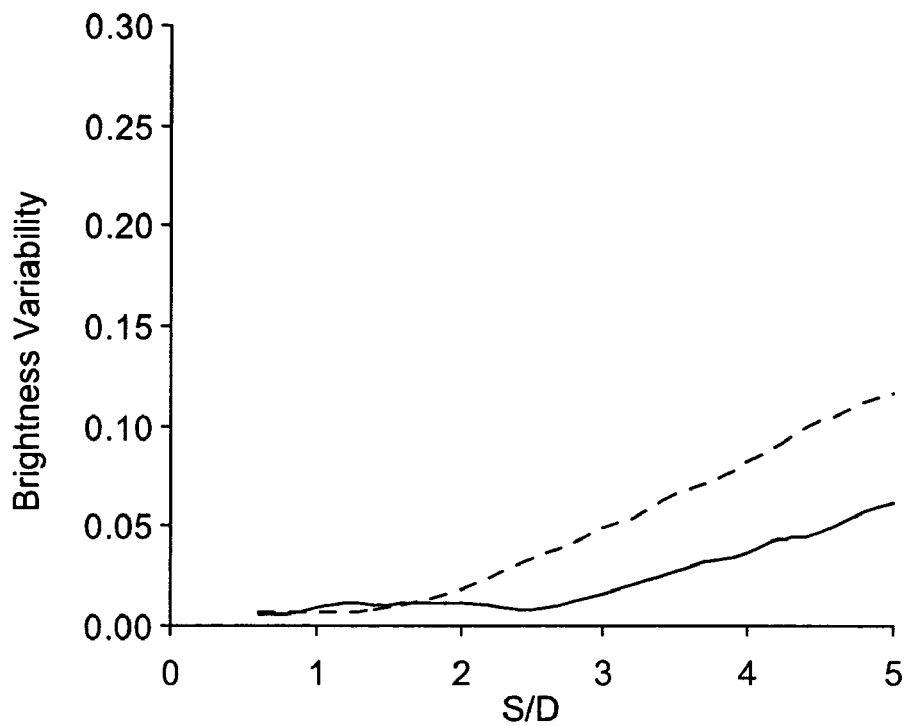
FIGS. 6a–f are graphs similar to FIGS. 3a–f, respectively, but for a third modeled backlight configuration.
Figure 6B:
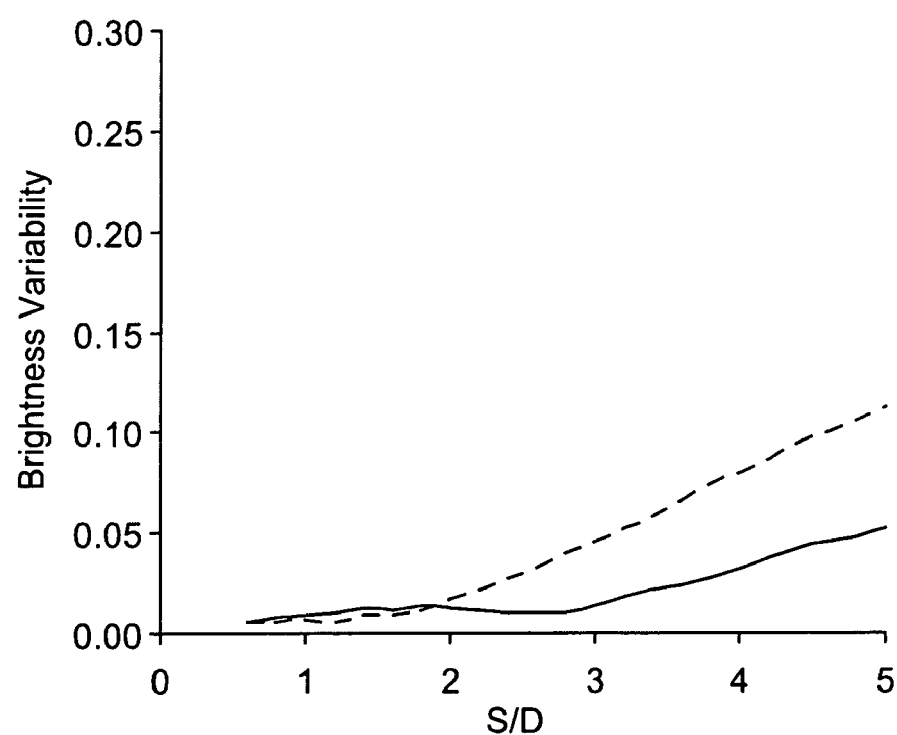
Figure 6C:
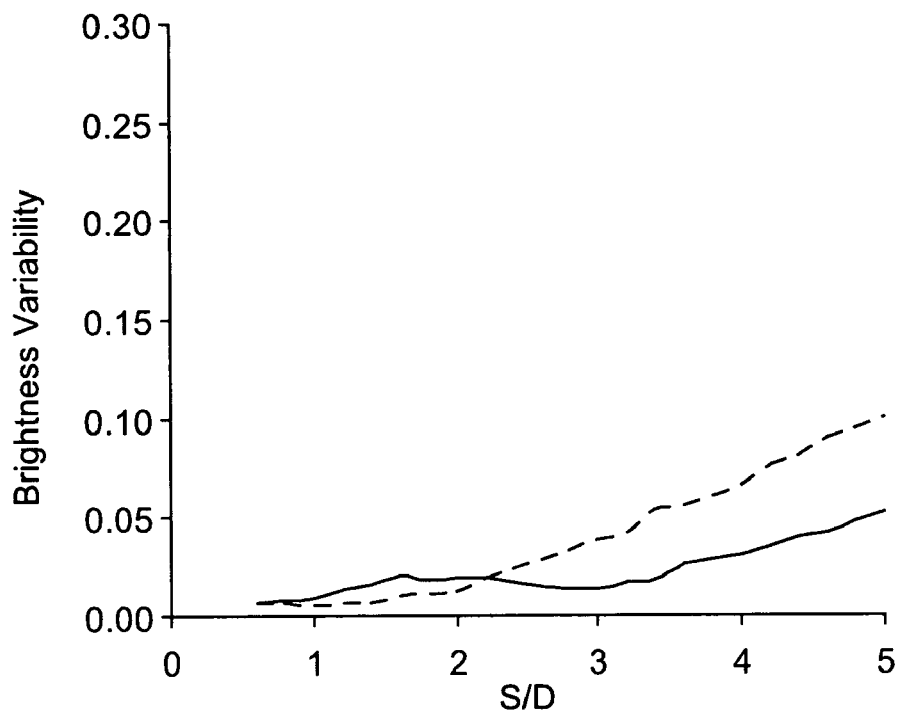
Figure 6D:
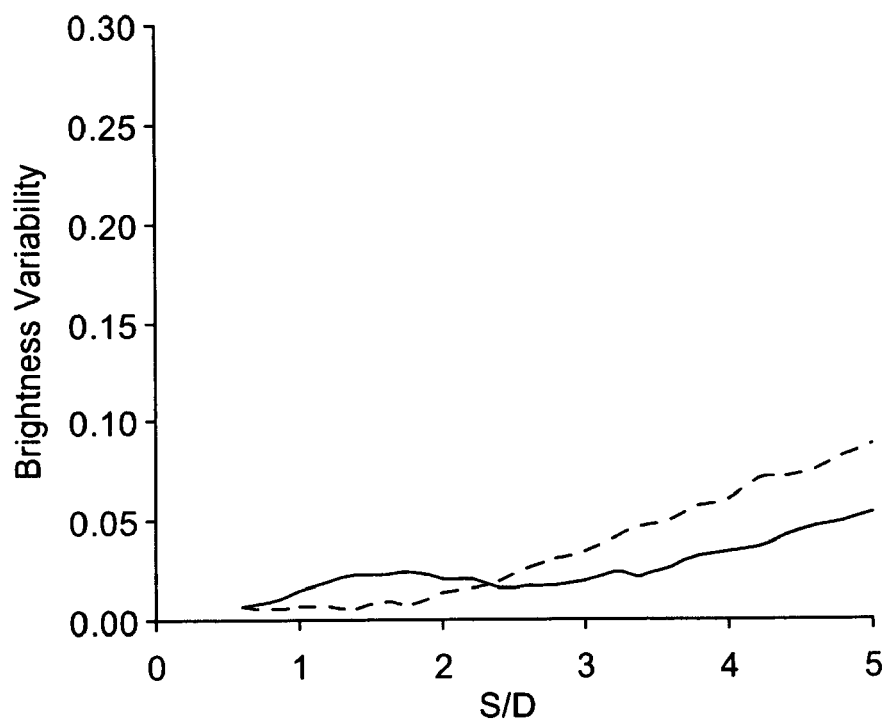
Figure 6E:
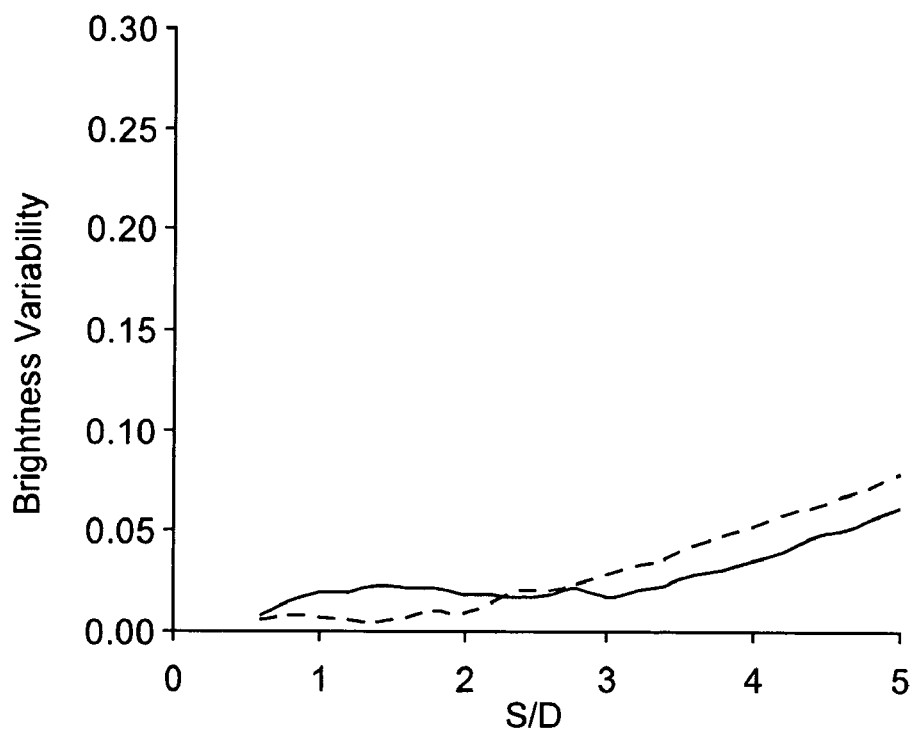
Figure 6F:
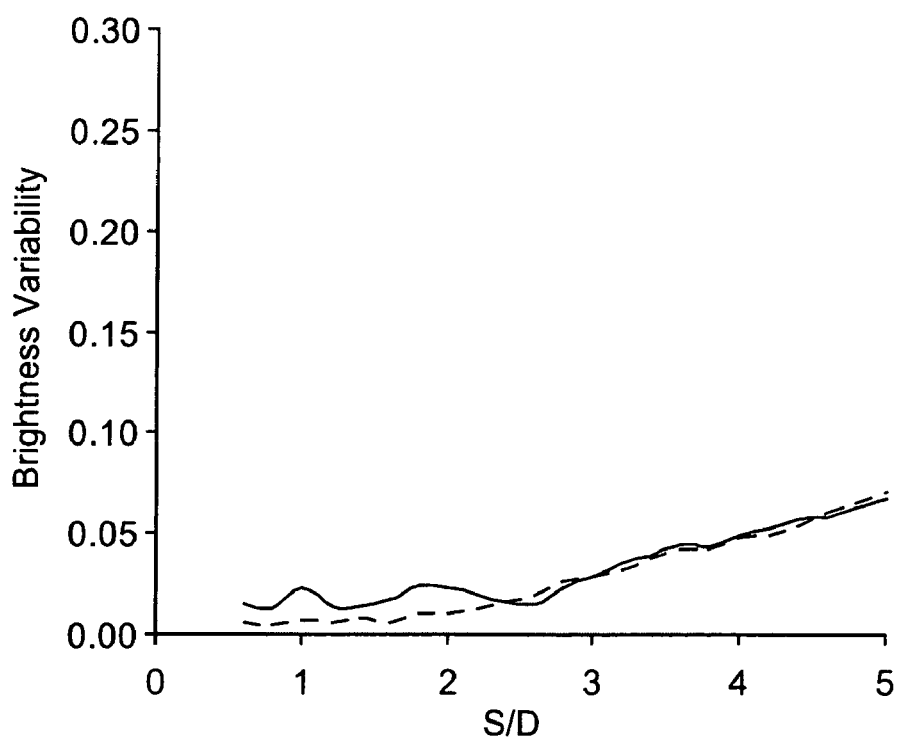

The reader will also note the unusual behavior of the solid line curves in the range of S/D from about 2 to 3, e.g., from 1.5 to 3.5, particularly for small values of T as in FIGS. 3a, 3b, and 3c. Within that range, as the cavity gets thinner and D decreases (and S/D increases), the brightness variability levels off and actually decreases (improving the brightness uniformity) somewhat, before beginning to increase again. This behavior is contrary to the general trend of poorer uniformity for thinner backlights, and has significant consequences for the backlight designer. Depending on starting parameters, a designer may be able to decrease the thickness of the backlight with little or no degradation in brightness uniformity, and possibly with an improvement in brightness uniformity.

Comparing FIGS. 3a–e, one can see that the proximity of the light sources to the back reflector significantly impacts the performance of the backlight. For example, for a large separation T=5R of FIG. 3f, the specular reflector provides virtually no benefit in backlight uniformity compared to a diffuse reflector, and the unusual behavior in the range S/D=2 to 3 is almost imperceptible. But for smaller separations such as those of FIGS. 3a–e, a benefit can be seen for larger values of S/D, and the anomalous behavior of the solid curve is more pronounced. Preferably, for optimal backlight uniformity in a thin construction, the light sources are close to or in contact with the back reflector, and T is in the range from 1R to 2R, or from 1R to 1.5R, or even from 1R to 1.1R, where T=1R corresponds to the light sources being in contact with the back reflector.

Additional modeling was done to investigate the sensitivity of the above results to the reflectivity of the sources. In FIGS. 3a–f, the reflectivity of the sources was assumed to be 50%. FIGS. 4a–f show the result of changing the source reflectivity to 100%. Thus, FIGS. 4a–f are completely analogous to FIGS. 3a–f respectively, with the sole difference that FIGS. 4a–f assume a source reflectivity of 100%. Some differences can be seen, for example, the anomalous behavior of the solid curves is shifted to somewhat higher values of S/D, and hence thinner backlights. Nevertheless, these differences do not greatly change the conclusions and observations described above.

The foregoing modeling assumes the first backlight configuration, in which the diffuser plate is 100% transmissive and no film stack is present. Further modeling was done on the second backlight configuration, in which the diffuser plate is 60% transmissive (and still no film stack is present). The brightness variability results are depicted in FIGS. 5a–f. For these figures, the source reflectivity was assumed to be 50%, as in FIGS. 3a–f. Hence, FIGS. 5a–f are completely analogous to FIGS. 3a–f respectively, with the sole difference that FIGS. 5a–f used a 60% transmissive diffuser plate. Inspection of FIGS. 5a–f reveals overall lower levels of brightness variability compared to the data presented in FIGS. 3 and 4, but consistent trends: generally increasing brightness variability for increasing S/D; lower brightness variability for a specular back reflector compared to a diffuse back reflector for values of S/D of about 2 or more, particularly where T is in the range from 1R to 2R, or from 1R to 1.5R, or even from 1R to 1.1R; and anomalous behavior in the case of a specular back reflector for values of S/D from about 2 to about 3, e.g., from 1.5 to 3.5.

Still more modeling was done, this time for the third backlight configuration, which uses a 60% transmissive Lambertian diffuser plate in combination with a film stack consisting of a single sheet of prismatic BEF and a reflective polarizer. The brightness variability results are depicted in FIGS. 6a–f. Source reflectivity was assumed to be 50%. Hence, FIGS. 6a–f are completely analogous to FIGS. 5a–f respectively, except for the addition of the film stack consisting of BEF and a reflective polarizer. Inspection of FIGS.

6a–f reveals even lower overall levels of brightness variability than the data presented in FIG. 5, but the same trends: generally increasing brightness variability for increasing S/D; lower brightness variability for a specular back reflector compared to a diffuse back reflector for values of S/D of about 2 or more, particularly where T is in the range from 1R to 2R, or from 1R to 1.5R, or even from 1R to 1.1R; and anomalous behavior in the case of a specular back reflector for values of S/D from about 2 to about 3, e.g., from 1.5 to 3.5.

Figure 7:
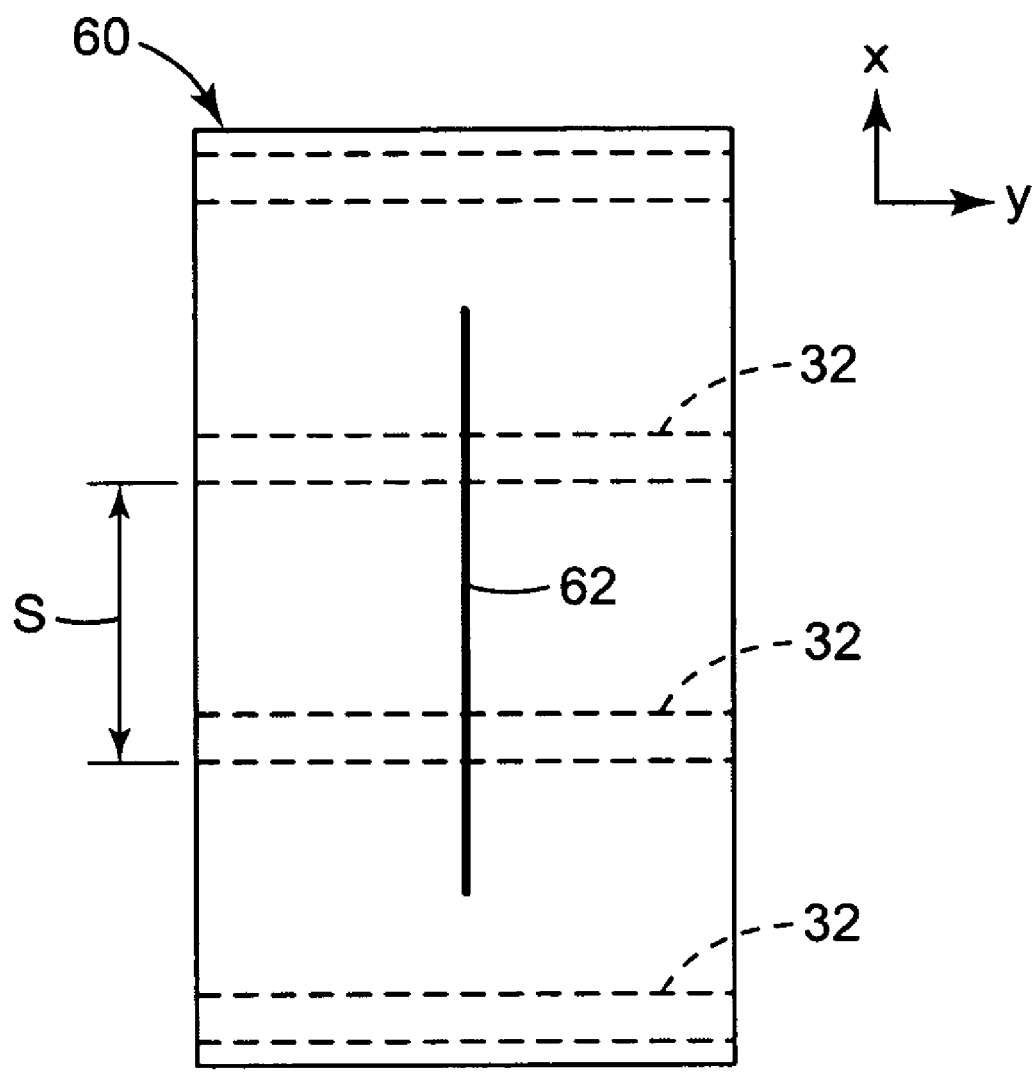
FIG. 7 is a front view of an aperture defining an output face of a modified backlight that was constructed and tested.

We have also constructed and compared the performance of direct-lit backlights made with conventional white diffuse back reflectors and those made with specular back reflectors. This was done by modifying the backlight portion of the LCD TV 10 described in connection with FIG. 1. The array of light sources 16 was removed as a unit from the LCD TV without changing the source-to-source spacing S, and was combined with a metal frame having a rectangular aperture 5 inches (about 127 mm) high by 3 inches (about 76 mm) wide to define a modified direct-lit backlight smaller in size than that of the original LCD-TV. The metal frame was placed centrally in relation to the sources 16, where height and width of the aperture are again considered to be oriented along the x- and y-axes respectively. A front view of the aperture is depicted in FIG. 7, where reference numeral 60 identifies the aperture. Four of the sources 16 are disposed directly within the aperture as shown, consistent with a direct-lit construction. The setup included a solid, flat back plate (disposed behind the sources) to which different reflective films useable as back reflectors could be attached. The setup also included a front plane member positionable within the aperture in front of the sources 16 to which different diffuser plates could be attached, and atop which film stacks could be placed. The 3 by 5 inch aperture of the frame defined the lateral extent of the modified backlight output surface. By positioning the back plate and the front plane member relative to the sources, different values of T, D, and G could be achieved. Also, by placing different films on the back plate, different back reflectors could be studied, and by placing different films (and diffuser plates) on the front plane member, the effect of different diffuser plates and/or film stack components could be studied. The optical films and layers were generally cut to match the size of the aperture before placing them in the modified backlight. A Prometric™ 1600 CCD Imaging Photometer and Radiometer, available from Radiant Imaging, Inc., Duvall, Wash., was mounted along an axis normal to the modified backlight and used to quantify the brightness across the output face of the modified backlight. This Prometric™ 1600 camera was computer controlled and capable of capturing images of the modified backlight, and quantitatively analyzing the images for luminance in units of nits, or candelas/m$^2$.

Two experimental configurations of the modified LCD TV backlight were tested and compared for absolute brightness and brightness uniformity. The first configuration represented a state-of-the art backlight similar to that shown in FIG. 1. It used a diffusely reflective back reflector and a gap dimension G of 15 mm. The second configuration used a specular back reflector and a thinner gap dimension G of 12.5 mm.

In particular, the first experimental configuration was characterized as follows:
- back reflector: a diffuse white back reflector, type RF215 sold by Tsujiden Co., Ltd., Tokyo, Japan;
- source array: CCFL source array taken from the above LCD TV:
  source radius R=1.5 mm; and
  source-to-source spacing S=33.8 mm (center-to-center);
- source-to-back reflector distance T=1.5 mm (sources in contact with back reflector, T=1R);
- diffuser plate: the patterned, non-uniform diffuser plate taken from the above LCD TV and described previously; the diffuser plate was arranged to be in registration with the light sources, just as it was in the commercial LCD TV;
- source-to-rear surface of diffuser plate D=13.5 mm, thus, S/D is about 2.5, within the range from about 2 to 3;
- gap distance G=15 mm;
- film stack atop the diffuser plate: in order, starting with the film closest to the diffuser plate, (1) a Vikuiti™ Brightness Enhancement Film-III-Transparent (BEFIII-T) prismatic film, available from 3M Company), oriented with prisms facing the front of the backlight and away from the diffuser plate; (2) Vikuiti™ Dual Brightness Enhancement Film-Diffuse 440 (DBEF-D440) reflective polarizing film, available from 3M Company; and (3) an absorbing polarizer film, product type LLC2-5518SF, available from Sanritz Corp.

Thus, the outermost or output surface of the modified back reflector was provided by the absorbing polarizing film.

Figure 8:
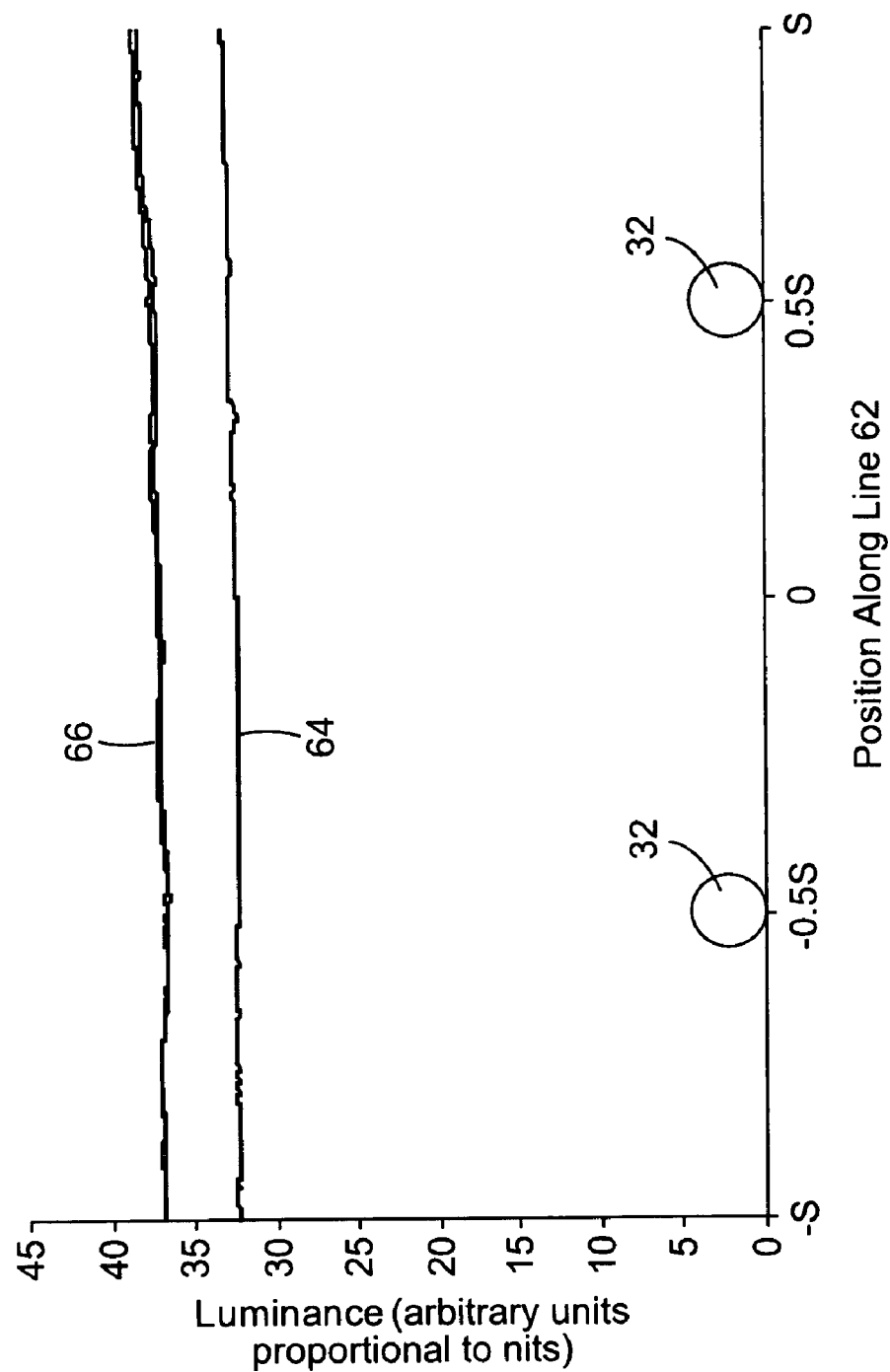
FIG. 8 is a graph of measured brightness data as a function of position on a portion of the modified backlight output face, for two experimental backlight configurations.

In preparation for taking data, the light source array was energized and allowed to heat up and stabilize for a minimum of 12 hours. The various optical films to be tested were then introduced to the backlight, and the arrangement was allowed to stabilize for an additional hour to minimize drift so that reliable absolute brightness values could be obtained. Finally, a digital image of the modified backlight was then obtained with the Prometric™ 1600 camera. A row of pixels corresponding to a line segment 62 as shown in FIG. 7 was then isolated, and plotted as curve 64 in FIG. 8. The line segment 62 has a length of 2S (about 67.5 mm) and is centrally located within the aperture, extending along the x-direction perpendicular to the length of the sources 32. FIG. 8 plots the spatial distribution of the measured luminance or brightness data, where the horizontal axis in FIG. 8 represents distance along the x-axis calibrated in units of source-to-source spacing S, and labeled such that the center of the line segment has a value of zero.

The modified backlight was then reconfigured into the second experimental configuration. This configuration replaced the diffuse back reflector of the first experimental configuration with a specular back reflector, replaced the patterned diffuser plate with a uniform diffuser plate, and used a thinner gap dimension G of 12.5 mm by positioning the diffuser plate closer to the sources (reducing D). The second experimental configuration was the same as the first experimental configuration except as follows:
- back reflector: a flat piece of Vikuiti™ Enhanced Specular Reflector (ESR), available from 3M Company, with reflectivity 98% or better reflectivity over the visible spectrum;
- diffuser plate: a diffuser plate that is uniform over its useful area was obtained from an LCD TV, model LC-30HV2U manufactured by Sharp Corp. This diffuser plate had a visible transmission of about 60% and an absorption of less than 3%, as measured with a Perkin-Elmer Lambda 900 spectrophotometer equipped with an integrating sphere attachment;
- source-to-rear surface of diffuser plate D=11.0 mm, thus, S/D is about 3.1, i.e., within the range from about 2 to 3; and
- gap distance G=12.5 mm.

The source-to-back reflector distance T was again 1.5 mm (sources in contact with the back reflector, T=1R).

The Sharp diffuser plate was similar in transmission to the diffuser plate used in the first experimental configuration, but differed significantly from the latter in that the former was uniformly diffusive over its useful area. The Sharp diffuser plate therefore required no careful registration with the light sources.

The same data collection procedure was used as that of the first experimental configuration, and the resulting brightness data collected as before over the line segment 62 is plotted as curve 66 in FIG. 8.

An average brightness and brightness variability analysis was then done on the data of curves 64, 66, where the average brightness and brightness variability was calculated using a statistical analysis tool sold by Minitab Inc. of State College, Pa. Two additional brightness scans for each of the two experimental configurations tested were also obtained, with results consistent with the data of curves 64, 66. Analysis of the data showed that the second experimental configuration achieved a 14% increase in average brightness relative to the first experimental configuration. The increase was statistically meaningful, with the confidence interval p-value being 0.001. Separate analysis also showed that the brightness variability of the second experimental configuration was statistically the same as that of the first experimental configuration. Thus, a thinner, brighter direct-lit backlight was constructed with no degradation in brightness uniformity across the output surface of the backlight, using a specular back reflector closely positioned with respect to the light sources, and using a uniform diffuser plate that requires no registration with the light sources.

Unless otherwise indicated, all numbers expressing feature sizes, amounts, and physical properties used in the specification and claims are to be understood as being modified by the term "about." Accordingly, unless indicated to the contrary, the numerical parameters set forth in the present specification and claims are approximations that can vary depending upon the desired properties sought to be obtained by those skilled in the art utilizing the teachings disclosed herein.

Various modifications and alterations of this invention will be apparent to those skilled in the art without departing from the scope and spirit of this invention, and it should be understood that this invention is not limited to the illustrative embodiments set forth herein. All U.S. patents and other patent and non-patent documents referred to herein are incorporated by reference, to the extent they are not inconsistent with the foregoing disclosure.

What is claimed is:

1. A backlight suitable for use in a display, comprising:
   a diffuser plate;
   a specular back reflector; and
   a plurality of elongated light sources disposed between the diffuser plate and the back reflector, the light sources having a cross-sectional diameter of 2R;
   wherein the light sources are positioned such that a distance T from centers of the light sources to the back reflector is no greaater than 2R;
   and wherein the light sources have source-to-source spacing S, where a distance from the diffusing plate to the center of the light source is D, and wherein S/D is at least 1.5.

2. The backlight of claim 1, wherein T is no greater than 1.5R.

3. The backlight of claim 2, wherein T is no greater than 1.1R.

4. The backlight of claim 3, wherein the light sources are in substantial contact with the back reflector.

5. The backlight of claim 1, wherein S/D is at least 2.

6. The backlight of claim 1, wherein S/D is in a range from about 2 to 3.

7. The backlight of claim 6, wherein S/D is no more than 3.5.

8. The backlight of claim 6, wherein S/D is in a range from 1.5 to 3.5.

9. The backlight of claim 1, wherein the diffuser plate has uniform diffusing properties over its useful area.

10. The backlight of claim 1, wherein the specular reflector has a diffusion half angle less than 10 degrees.

11. The backlight of claim 1, wherein the specular reflector has an average visible reflectivity of at least 90%.

12. The backlight of claim 11, wherein the specular reflector has an average visible reflectivity of at least 95%.

13. The backlight of claim 12, wherein the specular reflector has an average visible reflectivity of at least 98%.

* * * * *

UNITED STATES PATENT AND TRADEMARK OFFICE
CERTIFICATE OF CORRECTION

PATENT NO. : 7,220,036 B2 Page 1 of 1
APPLICATION NO. : 11/133504
DATED : May 22, 2007
INVENTOR(S) : Jennifer R. Yi It is certified that error appears in the above-identified patent and that said Letters Patent is hereby corrected as shown below:

Title Page Col. 1 (54) (Title),
Line 2, Delete "DISPLAY" and insert -- DISPLAYS --, therefor.

Column 1 (Title),
Line 2, Delete "DISPLAY" and insert -- DISPLAYS --, therefor.

Column 12,
Line 15, In Claim 1, delete "greaater" and insert -- greater --, therefor.

Signed and Sealed this

Fourteenth Day of August, 2007

JON W. DUDAS
*Director of the United States Patent and Trademark Office*